March 25, 1952 R. S. GREGOIRE 2,590,696
OIL SEAL
Filed Sept. 13, 1945 2 SHEETS—SHEET 1
FIG.1.
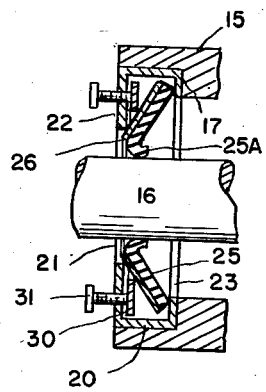
FIG.2.
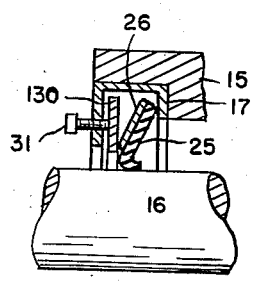
FIG.3.
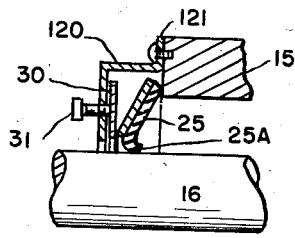
FIG.4.
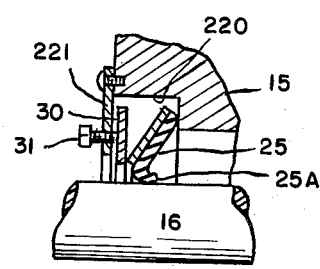
FIG.5.
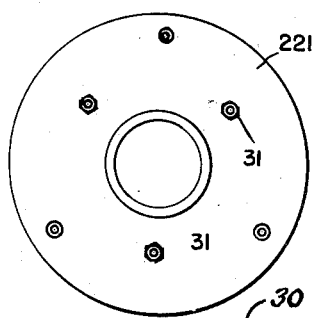
FIG.6.
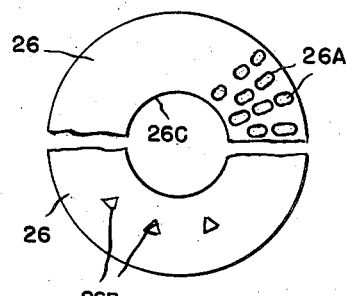
FIG.8.
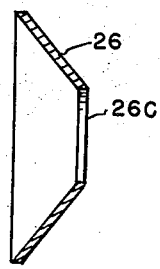
FIG.7.
FIG.18
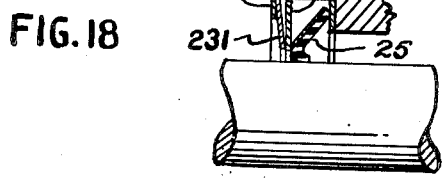
*INVENTOR.*
RESTA S. GREGOIRE
BY *Hauke & Hardesty*
ATTORNEYS March 25, 1952 R. S. GREGOIRE 2,590,696
OIL SEAL
Filed Sept. 13, 1945 2 SHEETS—SHEET 2
FIG.9.
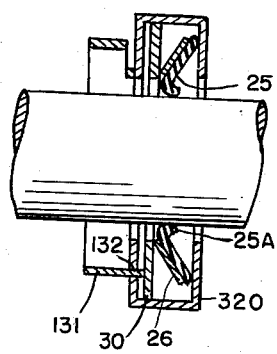
FIG.10.
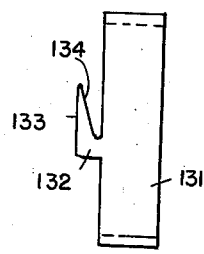
FIG.11.
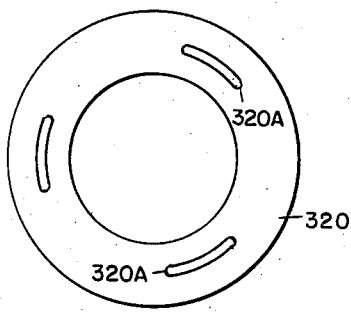
FIG.12.
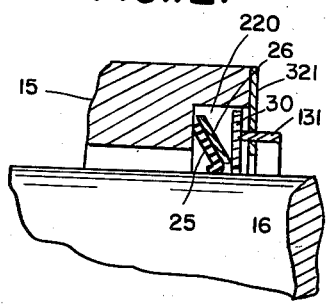
FIG.13.
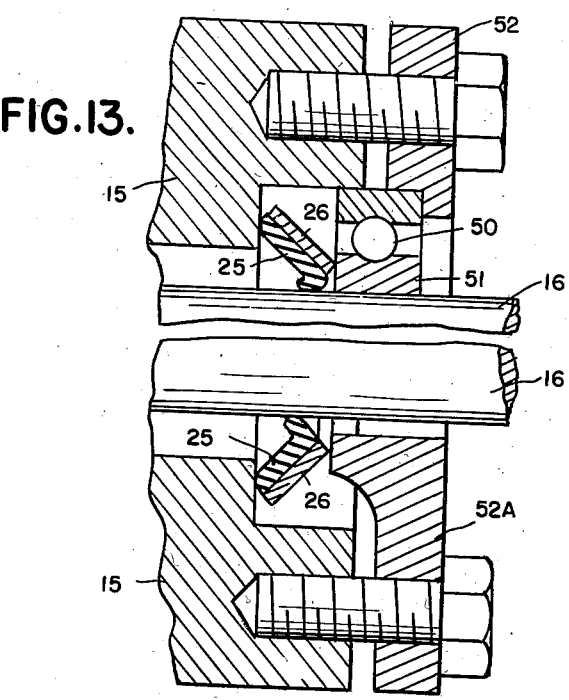
FIG.15.
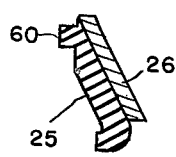
FIG.16. FIG.14.
FIG.17
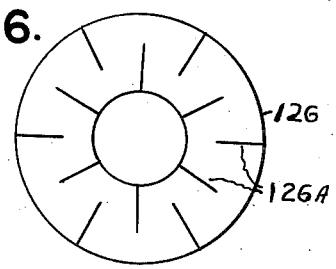
INVENTOR.
RESTA S. GREGOIRE
BY
ATTORNEYS Patented Mar. 25, 1952

2,590,696

UNITED STATES PATENT OFFICE 2,590,696

OIL SEAL

Resta S. Gregoire, Detroit, Mich.

Application September 13, 1945, Serial No. 616,074

1 Claim. (Cl. 288—3)

The present invention relates to liquid seals for moving shafts.

Among the objects of the invention is a liquid seal which is adjustable in its pressure against the shaft.

Another object is a seal which provides means by which compensation may be made for wear due to the contact between the seal and the moving shaft.

Another object is a seal which will be effective as a seal even though the bearing tolerance for the shaft allows relatively considerable lateral movement.

Another object is a seal which will align itself concentric with all bearing surfaces immediately upon installation.

Other objects and advantages will be apparent to those skilled in the art upon reference to the following description and the accompanying drawings in which Fig. 1 is a diametral sectional view of one form of seal, illustrating its use.

Fig. 2 is a radial sectional view of a somewhat modified form.

Fig. 3 is a radial sectional view of the form of Fig. 2, but showing a somewhat different installation.

Fig. 4 is a form of Fig. 1, but with another form of installation.

Fig. 5 is an end elevation of the seal of Fig. 4.

Figs. 6, 7 and 8 are detail views of conical shaped washers such as are used in the seal.

Fig. 9 is a sectional view showing a form of seal having quick adjusting means.

Fig. 10 and Fig. 11 show details of construction of the latter.

Fig. 12 is a sectional view of a quickly adjustable seal of the type of Fig. 4.

Figs. 13 and 14 are respectively radial sections of a fixed adjustment seal with and without an antifriction bearing.

Fig. 15 is a sectional view of a sealing ring of modified form.

Figs. 16 and 17 are views of modified forms of a conical shaped washer.

Fig. 18 is a sectional view of a form of seal with an automatic pressure adjusting ring.

In the drawings, in Figs. 1, 2 and 3, a housing is indicated as being provided with a suitable tubular boss 15, through which projects a movable shaft 16, rotatable or reciprocable. In Figs. 1 and 2, the boss 15 is shown as provided with an annular seat 17, upon which is seated the seal unit.

The seal unit of Fig. 1 consists of an annular box 20 open on its inner perimeter and having the opening 21 in its outer annular face 22 large enough to provide a considerable clearance for the shaft 16. The opening 23 in the inner annular face must be sufficiently large to allow the seal proper to be assembled in the box 20.

The seal proper consists of cone-shaped element 25 fixed to the inner face of a conical shaped spring washer 26, shown in detail in Figs. 6 to 8. This spring 26, known as a Belleville spring, consists of a dished spring washer, as shown in Fig. 8, will have the element 25 fixed to its inner face by a vulcanizing operation; if rubber, natural or synthetic, is used, and to aid in such fixing, the spring 26 may be perforated as indicated at 26A in Fig. 6. If a leather or similar seal element 25 is used, it may be bonded or fixed with a suitable adhesive, or barbs or prongs 26B, as in Fig. 7, may be used to hold the material if necessary.

The seal element 25 will, as shown, be somewhat wider than the spring 26, and abut the inner face of box 20. The inner edge of the element will preferably be formed with a short flange 25A to widen its contact with the shaft 16. This inner edge will be well within the opening 26C in the spring. In the form of Fig. 1, the inner edges of both spring 26 and seal 25 are exposed in the opening 21 of the box 20.

Also within the box 20 is a flat ring 30 of such width as to contact the spring 26 at a point intermediate the edges of the latter and movable axially of the seal unit by means of a plurality of screws 31 threaded in the face of box 20. It is preferred to use three such screws 31 as indicated in Fig. 5. Through the use of these screws 31, the spring 26 may be somewhat flattened, with the result that the seal member 25 is pressed inwardly against the shaft 16.

In the form shown in Fig. 2, the parts are substantially the same except that the adjusting ring 130 is of such size and arrangement as to contact the inner edge of spring 26.

In the form of seal shown in Fig. 3, the actual sealing elements are identical with those of Fig. 2, but the enclosing box 120 has its inner face turned outwardly as a flange 12' and fixed to the outer face of boss 15. No seat 17 is required.

In the seal of Fig. 4, instead of an enclosing box 20, a suitable recess 220 is cut into the boss 15, and this is covered by a plate 221. Otherwise the seal may be of the form shown in either of Figs. 1 and 2. The form shown in Fig. 4 is the same as is shown in Fig. 1, while the flat plate is indicated in Fig. 5.

While the foregoing description refers to the spring members as of spring metal, there will be cases where other more or less resilient metal will be sufficient and under some conditions even suitable plastic material may be used.

The seal element 25 may be any one of a number of materials such as leather, rubber (natural or synthetic), fiber, Neoprene, or certain plastics, depending upon the particular use and the fluid to be sealed.

In the forms of seal shown in Figs. 9 to 12, similar sealing gasket or washer 25 and the conical shaped washer 26 is used with a flat ring 30 acting against the inner edges of the latter. In this form, however, the outer wall of the box member 320 is provided with a plurality (preferably three) arcuate slots 320A and instead of screws 31, there is provided a ring 131 carrying a like number of cam members 132 adapted to extend through slots 320A and act on the ring 30. These cam members 132 have a flat surface 133 adapted to contact the ring 30, and an inclined surface 134 adapted to coact with the outer wall of the box 320 to force down the plate 30 when the ring 131 is partially rotated in one direction and relieve pressure on the plate when partially rotated in the other direction.

Fig. 12 shows a similar form of seal, but shows it mounted in a seat 220 formed in the boss 15 and held by a plate 321 as in Fig. 4. This plate 321 is slotted as shown for the box 320, and coacts with an adjusting ring 131 as in Fig. 9.

Fig. 13 shows the use of the seal with a fixed adjustment, the conical shaped washer being acted on by one race 51 of a ball bearing 50, and the bearing being held in position by a plate 52.

Fig. 14 shows a seal similar to that of Fig. 13, but without the ball bearing.

In the preceding figures, the sealing washer is shown as having a rounded portion at its outer edge and in most cases such a form will be used. However, instead of such rounded edge, it is also contemplated to mold a foot 60 on the washer 25 as shown in Fig. 15. Such a foot will give a better seal in cases where the contacting surface is not too well finished.

While in most forms of seal, the form of conical shaped spring or washer shown in Figs. 5 to 8 will be used, under conditions requiring a greater deflection or distortion of the spring, it is proposed to use the modified forms shown in Figs. 16 and 17.

In the form of Fig. 16, the frustroconical spring 126 is shown as being cut or slotted as at 126A, the cuts or slots extending from either edge to near the other edge. The number of cuts and their length will depend upon the amount of deflection or distortion required.

In Fig. 17, the spring 226 is shown as slotted or cut in its inner edge as at 226A.

In Fig. 18 there is shown a form of the seal in which the axial pressure adjustment is automatically provided in the use of a second conical spring 231 inserted between the plate 30 and the outer flange 22.

This application is a continuation in part of Serial No. 586,222, filed April 2, 1945, now abandoned.

I claim:

A fluid seal for moving shafts extending through a wall, said seal consisting of a frusto-conical washer of yieldable material extending between said shaft and wall, a frusto-conical spring member fixed to the outer surface of said washer, said spring member being of less width than said washer, an annular plate contacting said spring member intermediate its edges, a second plate fixed to said wall around said shaft and adjacent said first plate, said second plate being provided with arcuate slots, a ring member provided with circumferentially and axially projecting cam members carried by said second plate with the cam members extending through said slots and adapted to coact with said first plate and constructed and arranged to move the latter axially of the seal when the ring is partially rotated.

RESTA S. GREGOIRE.

REFERENCES CITED

The following references are of record in the file of this patent:

UNITED STATES PATENTS

| Number | Name | Date |
|---|---|---|
| 661,329 | Thompson | Nov. 6, 1900 |
| 1,616,883 | Bockholt | Feb. 8, 1927 |
| 1,652,747 | Van Rijswijk | Dec. 13, 1927 |
| 2,264,413 | Siegerist | Dec. 2, 1941 |
| 2,404,610 | Abell | July 23, 1946 |